United States Patent
Yang (10) Patent No.: US 11,860,351 B2
(45) Date of Patent: Jan. 2, 2024

(54) ILLUMINATION SYSTEM, SYSTEM, METHOD AND COMPUTER PROGRAM FOR A MICROSCOPE SYSTEM

(71) Applicant: Leica Instruments (Singapore) Pte. Ltd., Singapore (SG)

(72) Inventor: Gao Yang, Singapore (SG)

(73) Assignee: Leica Instruments (Singapore) Pte. Ltd., Singapore (SG)

( * ) Notice: Subject to any disclaimer, the term of this patent is extended or adjusted under 35 U.S.C. 154(b) by 233 days.

(21) Appl. No.: 17/205,075

(22) Filed: Mar. 18, 2021

(65) Prior Publication Data

US 2021/0294086 A1    Sep. 23, 2021

(30) Foreign Application Priority Data

Mar. 20, 2020   (DE) .................. 102020107788.2

(51) Int. Cl.
*G02B 21/08*    (2006.01)
*G02B 21/12*    (2006.01)

(52) U.S. Cl.
CPC .......... *G02B 21/082* (2013.01); *G02B 21/12* (2013.01)

(58) Field of Classification Search
CPC ...... G02B 21/082; G02B 21/12; G02B 21/00; G02B 21/0004; G02B 21/0012; G02B 21/06; G02B 21/08; G02B 21/36; G02B 21/361; G02B 21/364; G02B 21/365; G01C 3/00; G01S 7/4865
USPC ....... 359/385, 362, 363, 368, 369, 388, 390; 356/4.01, 4.07, 4.08, 5.01
See application file for complete search history.

(56) References Cited

U.S. PATENT DOCUMENTS

2014/0362435 A1 * 12/2014 Yokoi ............... G02B 21/0032
359/385

FOREIGN PATENT DOCUMENTS

| CA | 2930738 A1 * | 8/2016 | ......... A61B 1/00045 |
|---|---|---|---|
| DE | 102014107443 A1 | 12/2015 | |
| DE | 102015103426 A1 | 9/2016 | |
| JP | 2017146598 A | 8/2017 | |
| JP | 2021090753 A | 6/2021 | |
| WO | WO-2006080023 A1 * | 8/2006 | ......... G01N 21/8806 |
| WO | 2014067000 A1 | 5/2014 | |
| WO | 2017177180 A1 | 10/2017 | |

(Continued)

OTHER PUBLICATIONS

K-P-Proll et al: "Application of a liquid-crystal spatial light modulator for brightness applicaton in a microscopic topometry", Applied Optics, Optical Society of America, Washington, DC, US, vol. 39, No. 34, Dec. 1, 2000, pp. 6430-6435, XP002560164, ISSN: 0003-6935, DOI: 10.1364/AO.39.006430 *the whole documet*.

(Continued)

*Primary Examiner* — Arnel C Lavarias
(74) *Attorney, Agent, or Firm* — 2SPL Patent Attorneys PartG mbB; Yong Beom Hwang (57) ABSTRACT

Examples relate to an illumination system for a microscope system, and to a system, method and computer program for a microscope system. The illumination system includes an illumination module for providing a spatially modulated illumination of a sample. The illumination system further includes one or more processors configured to determine a depth characteristic of the sample. The one or more processors is configured to control the illumination module based on the depth characteristic of the sample.

16 Claims, 3 Drawing Sheets

(56) References Cited

FOREIGN PATENT DOCUMENTS

WO      2018063528 A1    4/2018
WO      2019071157 A1    4/2019

OTHER PUBLICATIONS

Proll Klaus-Peter et al: "Enhancement of the dynamic range of the detected intensity in an optical measurement system by a three-channel technique", Applied Optics, vol. 41, No. Jan. 1, 2002, p. 130, XP055828330, US, ISSN: 0003-6935, DOI: 10.1364/AO.41.000130 *the whole document.
K-P-Proll et al: "Application of a liquid-crystal spatial light modulator for brightness application in a microscopic topometry", Applied Optics, Optical Society of America, Washington, DC, US, vol. 39, No. 34, Dec. 1, 2000, pp. 6430-6435, XP002560164, ISSN: 0003-6935, DOI: 10.1364/AO.39.006430.
Proll Klaus Peter et al. "Enhancement of the dynamic range of the detected intensity in an optical measurement system by a three-channel technique", Applied Optics, vol. 41, No. 1, Jan. 1, 2002, p. 130, XP055828330, US ISSN: 0003-6935, DOI: 10.1364/AO.41.000130.

* cited by examiner

ILLUMINATION SYSTEM, SYSTEM, METHOD AND COMPUTER PROGRAM FOR A MICROSCOPE SYSTEM

TECHNICAL FIELD

Examples relate to an illumination system for a microscope system, and to a system, method and computer program for a microscope system, more specifically, but not exclusively, to a system, method and computer program for controlling the illumination system of the microscope system.

BACKGROUND

A major part of any microscopy setup is an illumination system, which is used to shine light on the viewing field to obtain sufficient brightness for observation. This is especially relevant in surgical microscopes, which are being used by surgeons to obtain a magnified view of a surgical site. Surgical microscopes generally have uniform illumination inside the viewing field, or a concentric zone-based illumination pattern with different light levels between zones.

SUMMARY

There may be desire for an improved concept for an illumination system for a microscope system.

This desire is addressed by the subject-matter of the independent claims.

Various embodiments of the present disclosure are based on the finding, that in surgical microscopy, oftentimes, the surgical site has a complex depth profile (i.e. depth characteristic) that the illumination provided by some illumination systems is not tailored to. For example, surgical microscopes are often used to perform surgery in deep wound tracts, which might not be uniformly illuminated by some illumination systems. Embodiments of the present disclosure may provide a more uniform illumination of the wound tract (or any irregularly shaped sample) by determining a depth characteristic of the sample, and controlling an illumination module that is capable of providing a spatially modulated illumination based on the depth characteristic of the sample. Thus, the depth profile may be considered in the illumination of the sample, which may enable a more uniform illumination of the sample.

Embodiments of the present disclosure provide an illumination system for a microscope system. The illumination system comprises an illumination module for providing a spatially modulated illumination of a sample. The illumination system further comprises one or more processors configured to determine a depth characteristic of the sample. The one or more processors is configured to control the illumination module based on the depth characteristic of the sample. In effect, the depth characteristic may be considered in the spatially modulated illumination of the sample, which may enable a more uniform illumination of the sample.

For example, the depth characteristic may comprise a slope of one or more portions of the sample. The one or more processors may be configured to control the illumination module based on the slope of the one or more portions of the sample. For example, a higher light intensity may be provided for the slope of the one or more portions of the sample.

For example, the one or more processors may be configured to control the illumination module such, that an intensity of the illumination is spatially modulated among the one or more portions of the sample based on the slope of the one or more portions of the sample. In other words, different slopes may lead to different illumination intensities.

In some embodiments, the depth characteristic comprises a three-dimensional representation of a surface of the sample. The one or more processors may be configured to determine a shading of the illumination caused by the surface of the sample based on the three-dimensional representation of the surface of the sample. The one or more processors may be configured to control the illumination module based on the shading of the illumination caused by the surface of the sample. In other words, the shading caused by the surface of the sample may be compensated via the spatially modulated illumination provided by the illumination module.

For example, the illumination module may be configured to spatially modulate an intensity of the illumination of the sample. The one or more processors may be configured to control the illumination module such, that an intensity of the illumination is spatially modulated based on the depth characteristic of the sample. In other words, differences in the effective illumination of the sample, as caused by the surface structure of the sample, may be compensated by the spatially modulated illumination provided by the illumination module.

There are various approaches for determining the depth characteristic. One approach is based on using a depth sensor. In other words, the one or more processors may be configured to obtain depth data of a depth sensor of the microscope system. The one or more processors may be configured to determine the depth characteristic of the sample based on the depth data. Depth sensors may provide highly detailed depth data on the sample, e.g. on the slopes of the portions of the sample.

For example, the one or more processors may be configured to obtain the depth data from a Time of Flight sensor of the microscope system. Alternatively, the one or more processors are configured to obtain the depth data from a stereoscopic depth sensor of the microscope system. Both types of depth sensors may be suitable for providing suitable depth data.

There are also different methods of spatially modulating the illumination. In some embodiments, the illumination of a light source is directed at a modulation device, which is configured to spatially modulate the illumination provided by the light source. In other words, the illumination module may comprise a light source for providing the illumination, and a modulation device for modulating the illumination provided by the light source.

There are different modulation devices that are suitable for spatially modulating the illumination. For example, the modulation device comprises one of a liquid crystal display, a liquid crystal on silicon display, a dot matrix display and a micromirror device. These displays and devices may be used to spatially tone down portions of the illumination provided by the light source.

Alternatively, the light source itself may be spatially modulated light source. In other words, the illumination module may comprise a spatially modulated light source, which may avoid the inclusion of a separate modulation device. For example, the illumination module may comprise one of a Mini-Light Emitting Diode (Mini-LED)-based spatially modulated light source, a Micro-Light Emitting Diode (Micro-LED)-based spatially modulated light source and an Organic Light Emitting Diode (OLED)-based spatially modulated light source, which may be suitable spatially modulated light sources.

In some cases, such as during surgery, the surface of the sample may change, e.g. as the surgeon removes parts of the tissue, or moves parts of the tissue out of the way. Accordingly, the spatially-modulated illumination may be adjusted to the changing depth characteristic of the sample. For example, the one or more processors may be configured to periodically update the depth characteristic of the sample. Accordingly, the spatially modulated illumination may be updated based on the updated depth characteristic.

Examples of the present disclosure may be applied to different types of samples having a complex depth characteristic. For example, the depth characteristic of the sample may represent a depth characteristic of a cavity of the surgical site. Alternatively, the depth characteristic of the sample may represent a depth characteristic of a workpiece. Examples may also be applied to other types of samples.

Embodiments of the present disclosure further provide a microscope system, such as surgical microscope system, comprising the illumination system.

Embodiments of the present disclosure further provide a system for a microscope system. For example, the system may be suitable for controlling an illumination module of the microscope system. The system comprises one or more processors and one or more storage devices. The system is configured to determine a depth characteristic of a sample being illuminated by an illumination module of an illumination system. The system is configured to control the illumination module based on the depth characteristic of the sample, to provide a spatially modulated illumination of the sample.

Embodiments of the present disclosure further provide a method for a microscope system. For example, the method may be suitable for controlling an illumination module of the microscope system. The method comprises determining a depth characteristic of a sample being illuminated by an illumination module of an illumination system. The method comprises controlling the illumination module based on the depth characteristic of the sample, to provide a spatially modulated illumination of the sample.

Embodiments of the present disclosure further provide a computer program with a program code for performing the method when the computer program is executed on a processor.

SHORT DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying draw-ings in which some examples are illustrated. In the figures, the thicknesses of lines, layers and/or regions may be exaggerated for clarity.

Figure 1A:
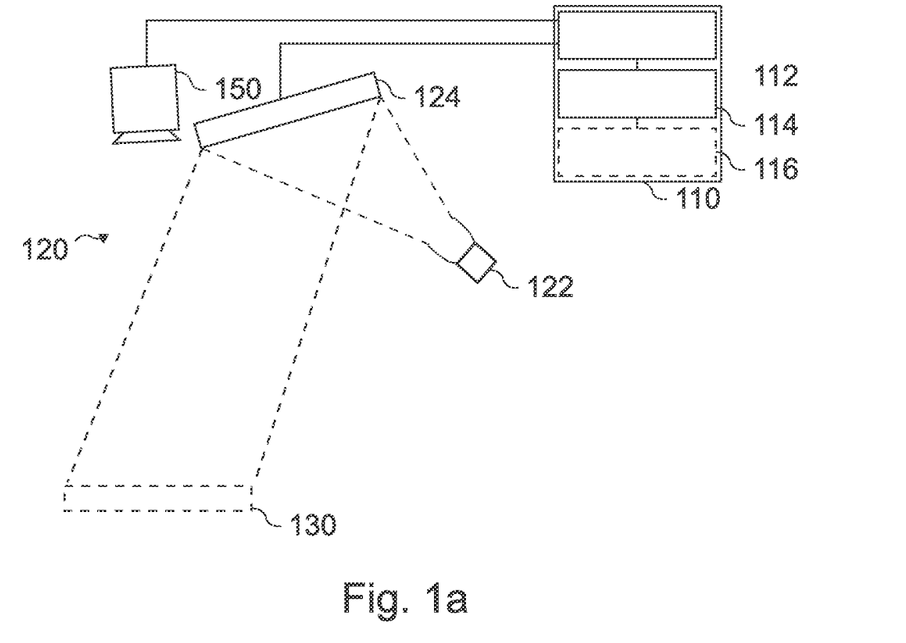
FIGS. 1a and 1b show schematic diagrams of embodiments of an illumination system for a microscope system, and of a system for the microscope system.
Figure 1B:
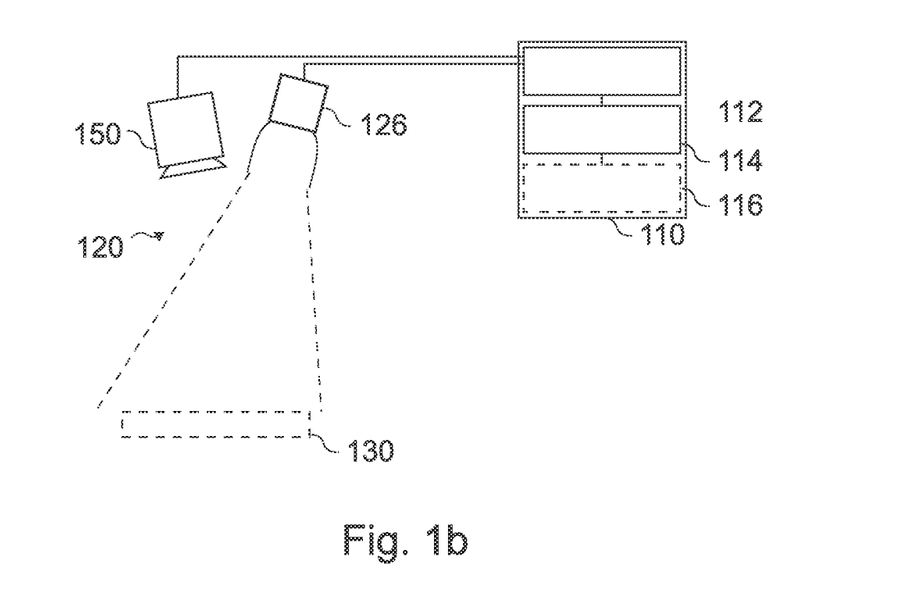

FIGS. 1a and 1b show schematic diagrams of embodiments of an illumination system for a microscope system 100, and of a system 110 for the microscope system 100. The illumination system comprises an illumination module 120 for providing a spatially modulated illumination of a sample 130. The illumination system comprises one or more processors 114 configured to determine a depth characteristic of the sample. The one or more processors 114 are configured to control the illumination module based on the depth characteristic of the sample.

For example, the one or more processors may be part of a system for the microscope system, e.g. a system for controlling the illumination module/system of the microscope system. The system comprises the one or more processors 114 and one or more storage devices 116. Optionally, the system comprises an interface 112. The one or more processors are coupled to the one or more storage devices and to the optional interface 112. In general, the functionality of the system 110 is provided by the one or more processors, in conjunction with the interface and/or the one or more storage devices. The system is configured to determine the depth characteristic of a sample 130 being illuminated by an illumination module 120 of an illumination system. The system is configured to control the illumination module 120 (e.g. via the interface 112) based on the depth characteristic of the sample, to provide a spatially modulated illumination of the sample.

Figure 1C:
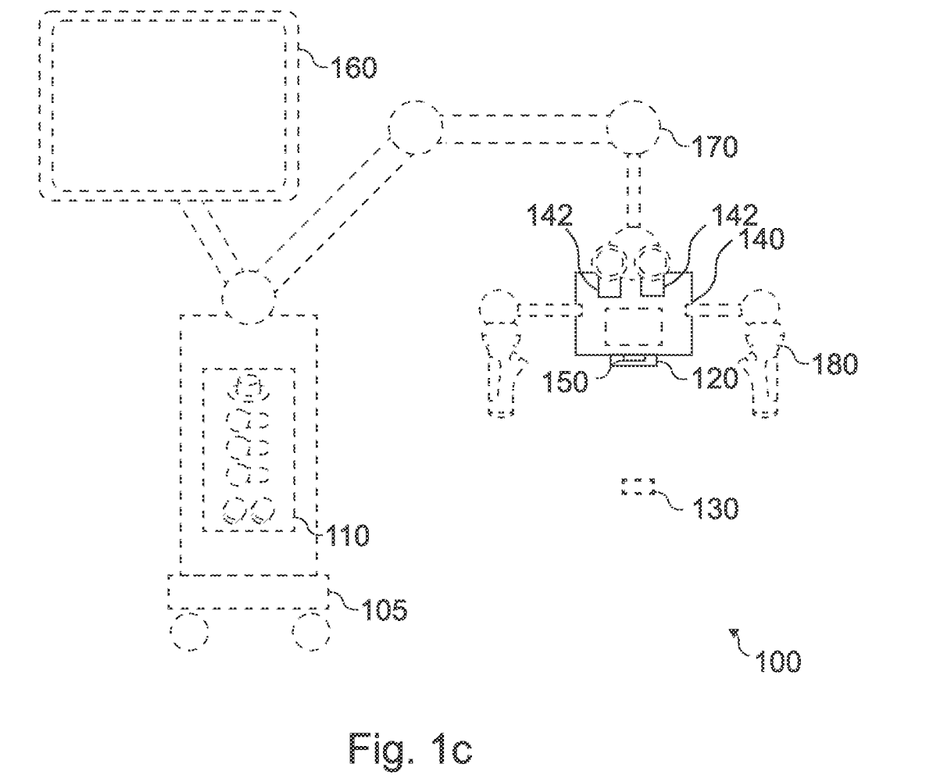
FIG. 1c shows a schematic diagram of an embodiment of a microscope system.

At least some aspects of FIG. 1a relate to an illumination system for a microscope. In general, a microscope, such as the microscope 140 shown in FIG. 1c, is an optical instrument that is suitable for examining objects that are potentially too small to be examined by the human eye (alone). For example, a microscope may provide an optical magnification of a sample. In modern microscopes, the optical magnification is often provided for a camera or an imaging sensor. Alternatively, a purely optical approach may be taken. The microscope 140 may further comprise one or more optical magnification components that are used to magnify a view on the sample, such as an objective (i.e. lens). In the context of this application, the term "(surgical) microscope system" is used, in order to cover the portions of the system that are not part of the actual microscope (which comprises optical components), but which are used in conjunction with the microscope, such as the system 110 or the illumination module 120.

There are a variety of different types of microscopes. If the microscope is used in the medical or biological fields, the sample 130 being viewed through the microscope may be a sample of organic tissue, e.g. arranged within a petri dish or present in a part of a body of a patient. For example, the microscope system 100 may be a microscope system for use in a laboratory, e.g. a microscope that may be used to examine the sample of organic tissue in a petri dish. Alternatively, the microscope 140 may be part of a surgical microscope system 100, e.g. a microscope to be used during a surgical procedure. Such a system is shown in FIG. 1c, for example. Although embodiments are described in connection with a microscope, they may also be applied, in a more general manner, to any optical device.

In microscope systems, illumination systems are generally used to illuminate the sample 130, e.g. a sample on a sample stage (in case of a laboratory microscope), or a patient on an oper-ating table. Consequently, the illumination module 120 may be configured to emit light towards the sample 130 to be observed via the microscope 140. In other words, the light emitted by the illumination module may be directed at the sample 130, e.g. at the sample stage, or towards the patient. To avoid an overly wide beam angle of the light source, optical concentration elements may be used to direct the light towards the sample. In general, different kinds of optical concentration elements may be used, such as lenses, light guides, or parabolic con-centrators.

FIG. 1c shows a schematic diagram of an embodiment of the microscope system 100, which comprises the illumination system and the microscope 140. The microscope system shown in FIG. 1c is a surgical microscope system, i.e. a microscope system for use during surgery. However, the illumination system and/or the system 110 may be used with other microscope systems or optical systems as well. The surgical microscope system 100 shown in FIG. 1b comprises a number of optional components, such as a base unit 105 (comprising the system 110) with a (rolling) stand, one or more displays 160, a (robotic or manual) arm 170 which holds the microscope 140 in place, and which is coupled to the base unit 105 and to the microscope 140, and steering handles 180 that are attached to the microscope 140. One or more of the displays may be part of the microscope 140, e.g. as auxiliary or as ocular displays. In the context of this application, the term "(surgical) microscope system" is used, in order to cover the portions of the system that are not part of the actual microscope (which comprises optical components), but which are used in conjunction with the microscope, such as the display or an illumination system.

In general, the illumination module 120 may be a surgical illumination module, i.e., an illumination module for illuminating the sample during surgery, so it can be observed visually by the surgeon. For example, the illumination module 120 may be configured to illuminate the sample for viewing through the microscope. The illumination system comprises the illumination module 120 for providing the spatially modulated illumination of a sample 130. In other words, the illumination module 120 is suitable for providing an illumination of the sample that is spatially modulated, i.e. that is different between a first portion of the light being incident to a first portion of the sample and a second portion of the light being incident to a second portion of the sample. When the illumination is reflected by the sample, however, the resulting illumination may be (substantially) uniform, i.e. substantially similar between different portions of the sample. Merely the light being emitted by the illumination module might be spatially modulated. In other words, the light emitted by the illumination module 120 may be spatially modulated, such that different portions (i.e. portions of the light beam) of the emitted light have different properties, such as light intensities. In other words, the light emitted by the illumination module may have a spatially non-uniform brightness. Accordingly, the illumination module may be configured to spatially modulate an intensity of the illumination of the sample. For example, the light emitted by the illumination module 120 may comprise a first portion having a first illumination intensity, and a second portion a second illumination intensity being different from the first illumination intensity. In other words, the spatial illumination of the light emitted by the illumination module may relate to the light intensity of different portions of the light emitted by the illumination module. For example, the illumination module may be suitable for (i.e. configured to) emitting/emit light having an adjustable spatially modulated light intensity pattern, e.g. an adjustable two-dimensional spatially modulated light intensity pattern. In other words, the light emitted by the illumination module may have an adjustable, two-dimensional pattern, with the two-dimensional being based on the depth characteristic of the sample. In general, the illumination module may be at least partially arranged at the microscope, e.g. adjacent to an objective to microscope 140.

There may be two main concepts for implementing such spatially modulated light sources. In a first concept, a light source (which is configured to emit light substantially homogeneously) is combined with a modulation device, which performs the spatial modulation of the light emitted by the light source. In other words, as shown in FIG. 1a, the illumination module may comprise a light source 122 for providing the illumination, and a modulation device 124 for modulating the illumination provided by the light source. As shown in FIG. 1a, the modulation device 124 may be implemented as a spatially modulated mirror, configured to reflect the light emitted by the light source in a spatially modulated manner. In other words, the modulation device may be configured to reflect the light emitted by the light source towards the sample. Due to portions of the modulation device having a different reflectivity, the light emitted by the illumination module may be spatially modulated. For example, a display or a micromirror device may be used to reflect the light emitted by the light source. The light reflected by the display or micromirror device may be spatially modulated based on the brightness of the spatially modulated pattern shown by the display or micromirror device, as the different brightness may lead to a different reflectivity (and thus different attenuation) of the portions of the display or micromirror device. Accordingly, the modulation device may comprise one of a liquid crystal display (LCD), a liquid crystal on silicon (LCoS) display, a dot matrix display (DMD) and a micromirror device, e.g. a micromirror device that is similar to a micromirror device being used in projectors. Alternatively, the modulation device may comprise a (semi-)transparent display that is configured used to spatially modulate the light emitted by the light source. In this case, the modulation device may be arranged between the light source and the sample (not shown). The light source may be a halogen-based light source or an LED-based light source. In some embodiments, the light emitted by the light source may be emitted towards the modulation device via a fiber light conductor.

Alternatively, the light source itself may be spatially modulated. In other words, the illumination module may comprise a spatially modulated light source 126. The spatially modulated light source 126 may be a light source that is capable of emitting spatially modulated light without requiring a separate modulation device. There are different light sources that provide such functionally. For example, the illumination module may comprise one of a Mini-Light Emitting Diode (Mini-LED)-based spatially modulated light source, a Micro-Light Emitting Diode (Micro-LED)-based spatially modulated light source and an Organic Light Emitting Diode (OLED)-based spatially modulated light source. The previously named spatially modulated light source may be configured to spatially modulate the light emitted by the respective spatially modulated light source. In other words, the light emitted by the spatially modulated light source may be spatially modulated, in order to provide a spatially modulated illumination of the sample.

Both types of illumination module may be used to illuminate the sample such that the sample is illuminated with spatially modulated light, with the spatial modulation being based on the depth characteristic of the sample. Accordingly, the one or more processors, or more generally the system 110, is/are configured to determine the depth characteristic of the sample. For example, the depth characteristic of the sample may represent a depth characteristic of a cavity of the surgical site, or a depth characteristic of a workpiece. In this context, the depth characteristic (or depth profile) may relate to the distance (i.e. depth) and/or slope (i.e. an angle relative to the illumination module) of portions of the surface of the sample relative to the illumination module. In other words, the depth characteristic may comprise a slope of one or more portions of the sample (i.e. an angle of the one or more portions of the sample relative to the illumination module). In some embodiments, a plurality of portions of the sample may be distinguished. For example, the sample may be sub-divided into a two-dimensional grid of portions, and the depth characteristic may comprise information on the slope of the plurality of portions according to the grid. The steeper the slope, the darker the respective portion may appear (in unmodulated light), as the same amount is light is incident to a larger surface area of the portion. In various embodiments, the depth characteristic may comprise a three-dimensional representation of the surface of the sample, e.g. a three-dimensional model of the surface, e.g. relative to the illumination module or relative to a reference coordinate system).

Again, different approaches may be chosen for determining the depth characteristic of the sample. For example, the depth characteristic may be determined using a depth sensor. For example, the one or more processors (i.e. the system) may be configured to obtain depth data of a depth sensor 142; 150 of the microscope system (e.g. via the interface 112). For example, the depth sensor 142; 150 may be separate from the illumination module 120. The depth data may comprise a depth map, i.e. a three-dimensional representation of the distance of different portions of the sample relative to the depth sensor. The one or more processors may be configured to determine the depth characteristic of the sample based on the depth data. For example, the one or more processors may be configured to determine the depth characteristic such, that the three-dimensional representation of the distance of different portions of the sample relative to the depth sensor is converted to a three-dimensional representation of the surface of the sample relative to the illumination module (or relative to a reference coordinate system). Additionally or alternatively, the processors may be configured to determine the slope of the one or more portions of the sample based on the depth data.

For example, the one or more processors (i.e. the system) may be configured to obtain the depth data from a Time of Flight sensor 150 of the microscope system, e.g. from an infrared light-based Time of Flight sensor or from an ultrasound-based Time of Flight sensor. Alternatively (or additionally), the one or more processors (i.e. the system) may be configured to obtain the depth data from a stereoscopic depth sensor 142 of the microscope system. For example, the stereoscopic depth sensor 142 may use the imaging sensors of the microscope, and may further comprise a lighting module for emitting structured light. In this case, the one or more processors may be configured to process the imaging sensor data provided by the imaging sensors of the microscope, and determine the depth characteristic based on the structured light that is visible within the imaging sensor data. Alternatively, the structured light may be provided by the illumination module. For example, the respective depth sensor(s) may be arranged at or within the microscope 140.

In another embodiment, the depth characteristic may be determined based on a brightness of the one or more portions of the sample, as perceived within the imaging sensor data of the imaging sensor or imaging sensors of the microscope. In other words, the one or more pro-cessors/the system may be configured to determine the depth characteristic of the sample based on the brightness of the one or more portions of the sample, as perceived within the imaging sensor data of the imaging sensor or imaging sensors of the microscope.

The one or more processors, or respectively the system, are/is configured to control the illumination module based on the depth characteristic of the sample. For example, the one or more processors/the system may be configured to control the illumination such, that a uniform or homogenic illumination of the sample is provided, i.e. at least that the uniformity or homogeneity of the illumination is improved relative to a non-spatially modulated illumination of the sample. In other words, the light emitted by the illumination module may be spatially modulated in a manner, that improves the uniformity or homogeneity of the illumination of the sample. Accordingly, the one or more processors/the system may be configured to control the illumination module such, that an intensity of the illumination is spatially modulated based on the depth characteristic of the sample. For example, the one or more processors/the system may be configured to determine an illumination pattern (e.g. a two-dimensional illumination pattern) based on the depth characteristic of the sample (i.e. reflecting the depth-characteristic of the sample), and to control the illumination module such, that an intensity of the illumination is spatially modulated based on the determined illumination pattern.

As has been pointed out before, at a steep slope of a portion of the sample, a non-spatially modulated illumination may result in a perception of the sample, in which the steep slope appears less bright. The one or more processors/the system may be configured to compensate for that effect, by controlling the illumination module based on the slope of the one or more portions of the sample. In other words, the one or more processors (i.e. the system) may be configured to control the illumination module based on the slope of the one or more portions of the sample. For example, the illumination pattern may be based on the slope of the one or more portions of the sample. For example, the steeper the slope, the higher the brightness of the portion of the illumination emitted by the illumination module may be. In more general terms, the one or more processors/the system may be configured to control the illumination module such, that an intensity of the illumination is spatially modulated among the one or more portions of the sample based on the slope of the one or more portions of the sample. For example, the one or more processors/the system may be configured to control the illumination module such, that the intensity of the illumination is higher for a portion having a steeper slope (i.e. more acute angle) than for a portion having a less steep slope (i.e. less acute angle). For example, the one or more processors/the system may be configured to control the illumination module such, that the intensity of the illumination is proportional to the steepness of the slope of the respective portion of the sample.

The steepness of the slope is a good proxy for the perceived brightness at the respective portion of the sample. In some embodiments, however, a more complex implementation may be used, in which also the actual rays emitted by the illumination module are taken into account. As has been introduced above, the depth characteristic may comprise a three-dimensional representation of the surface of the sample. This three-dimensional representation of the surface of the sample may now be used to estimate the amount of light that is incident to the one or more portions of the surface of the sample, e.g. due to partial shading of the light source due to the surface structure of the sample (and/or due to surgical instruments being employed by the surgeon). Accordingly, the one or more processors/the system may be configured to determine a shading of the illumination caused by the surface of the sample based on the three-dimensional representation of the surface of the sample. For example, the one or more processors/the system may be configured to perform ray tracing for the rays of light being emitted by the illumination module, using the three-dimensional representation of the surface of the sample, to determine the shading of the illumination caused by the surface of the sample. Additionally, the one or more processors/the system may be configured to determine a shading being caused by a surgical tool being used by the surgeon, e.g. based on the depth data. The one or more processors/the system may be configured to control the illumination module based on the shading of the illumination caused by the surface of the sample (and/or caused by the surgical tool). For example, the one or more processors/the system may be configured to control the illumination such, that the spatially modulated light emitted by the illumination module at least partially compensates for the shading of the illumination caused by the surface of the sample (and/or caused by the surgical tool).

In general, the sample may change over time. For example, during a surgical procedure, the surgeon may remove parts of the sample, or deform parts of the sample to move them out of the way. The spatially modulated illumination may be adjusted when than happens. For example, the one or more processors/the system may be configured to periodically update (i.e. determine anew) the depth characteristic of the sample. Accordingly, the one or more processors/the system may be configured to control the illumination module such, that the spatially modulated illumination is adjusted to the updated depth characteristic of the sample.

The interface 112 may correspond to one or more inputs and/or outputs for receiving and/or transmitting information, which may be in digital (bit) values according to a specified code, within a module, between modules or between modules of different entities. For example, the interface 112 may comprise interface circuitry configured to receive and/or transmit information. In embodiments the one or more processors 114 may be implemented using one or more processing units, one or more processing devices, any means for processing, such as a processor, a computer or a programmable hardware component being operable with accordingly adapted software. In other words, the described function of the one or more processors 114 may as well be implemented in software, which is then executed on one or more programmable hardware components. Such hardware components may comprise a general-purpose processor, a Digital Signal Processor (DSP), a micro-controller, etc. In at least some embodiments, the one or more storage devices 116 may comprise at least one element of the group of a computer readable storage medium, such as an magnetic or optical storage medium, e.g. a hard disk drive, a flash memory, Floppy-Disk, Random Access Memory (RAM), Programmable Read Only Memory (PROM), Erasable Programmable Read Only Memory (EPROM), an Electronically Erasable Programmable Read Only Memory (EEPROM), or a network storage.

More details and aspects of the system and microscope system are mentioned in connection with the proposed concept or one or more examples described above or below (e.g. FIGS. 2 to 4). The system and microscope system may comprise one or more additional optional features corresponding to one or more aspects of the proposed concept or one or more examples described above or below.

Figure 2:
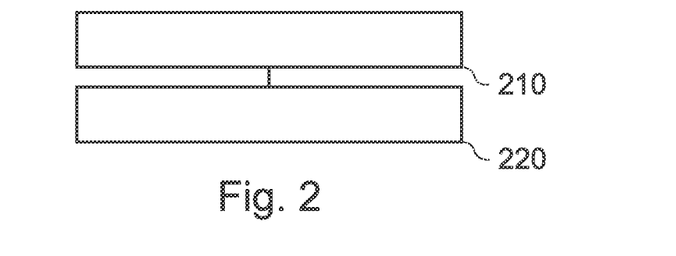
FIG. 2 shows a flow chart of an embodiment of a method for a microscope system.

FIG. 2 shows a flow chart of an embodiment of a corresponding method for a microscope system. The method comprises determining 210 a depth characteristic of a sample being illuminated by an illumination module of an illumination system. The method comprises controlling 220 the illumination module based on the depth characteristic of the sample, to provide a spatially modulated illumination of the sample.

As indicated above, features described in connection with the system 110, the illumination module 120 and the microscope system 100 of FIGS. 1a to 1d may be likewise applied to the method of FIG. 2.

More details and aspects of the method are mentioned in connection with the proposed concept or one or more examples described above or below (e.g. FIG. 1a to 1d, 3 to 4). The method may comprise one or more additional optional features corresponding to one or more aspects of the proposed concept or one or more examples described above or below.

Various embodiments relate to an apparatus for patterned illumination (i.e. spatially modulated illumination) in surgical microscopes, such as the surgical microscope system 100. Various embodiments may thus relate to patterned illumination.

For specimen (i.e. samples) with irregular-shaped depth profiles, there may be a high contrast (between different portions of the sample) under uniform lighting, resulting in poor simulta-neous visibility of different parts/portions. Embodiments may provide an approach for reducing the contrast in illumination between the different parts.

In embodiments, the scene illumination pattern (i.e. the spatially modulated illumination) may be computed (based on measured depths or otherwise) or specified by the user. The (light emitted by the) light source may go through a modulator (e.g. LCD, LCOS, DMD) that atten-uates the light by individual small regions. Alternatively, a self-emitting pixel array (e.g. OLED, micro-LED) can serve as a light source without a separate modulator. The resulting light may be projected onto the scene (sample) to give appropriate illumination to each small area, giving the overall scene a contained contrast range.

Figure 3:
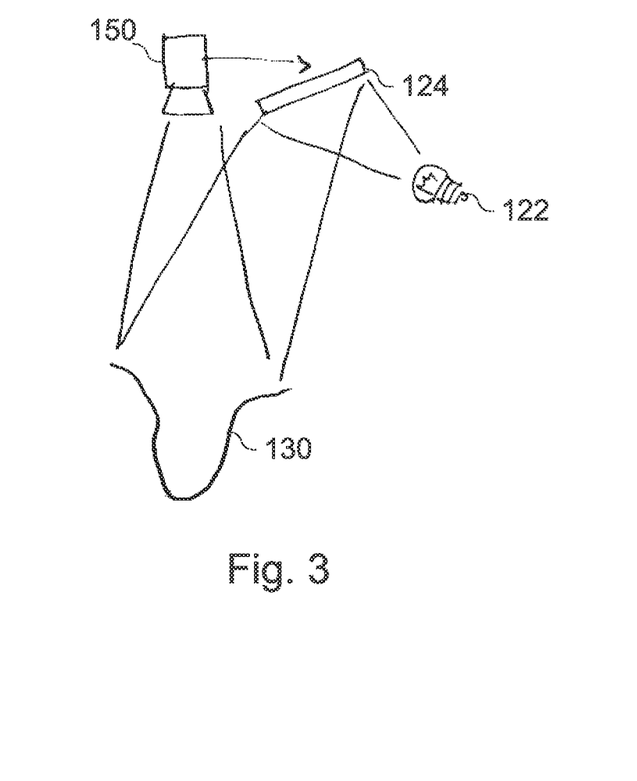
FIG. 3 shows a schematic diagram of an embodiment of an illumination system for a microscope system.
Figure 4:
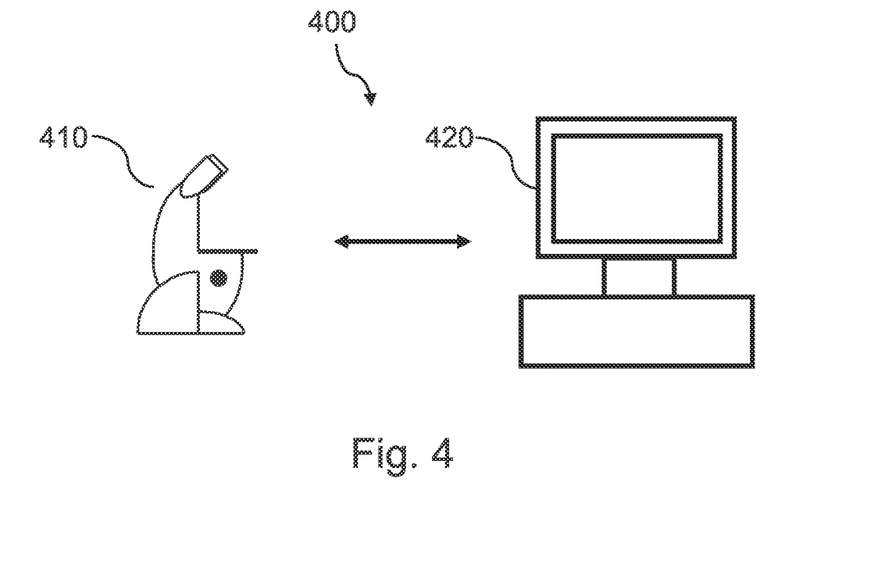
FIG. 4 shows a schematic diagram comprising a microscope and a computer system.

FIG. 3 shows a schematic diagram of an embodiment of an illumination system for a microscope system. In FIG. 3, a light source 122, a modulator 124 and a depth sensor 150 is shown. The light of the light source is emitted towards the modulator, and reflected towards the spec-imen/sample 130, which has a deep depth profile with steep slopes.

More details and aspects of the concept are mentioned in connection with the proposed concept or one or more examples described above or below (e.g. FIG. 1a to 2, 4). The concept may comprise one or more additional optional features corresponding to one or more aspects of the proposed concept or one or more examples described above or below.

Some embodiments relate to a microscope comprising a system as described in connection with one or more of the FIGS. 1 to 3. Alternatively, a microscope may be part of or connected to a system as described in connection with one or more of the FIGS. 1 to 3. FIG. 4 shows a schematic illustration of a system 400 configured to perform a method described herein. The system 400 comprises a microscope 410 and a computer system 420. The microscope 410 is configured to take images and is connected to the computer system 420. The computer system 420 is configured to execute at least a part of a method described herein. The computer system 420 may be configured to execute a machine learning algorithm. The computer system 420 and microscope 410 may be separate entities but can also be integrated together in one com-mon housing. The computer system 420 may be part of a central processing system of the microscope 410 and/or the computer system 420 may be part of a subcomponent of the microscope 410, such as a sensor, an actor, a camera or an illumination unit, etc. of the microscope 410.

The computer system 420 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 420 may comprise any circuit or combination of circuits. In one embodiment, the computer system 420 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 420 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 420 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 420 may also include a display device, one or more speakers, and a keyboard and/or controller, which can include a mouse, trackball, touch screen, voice-recognition device, or any other device that permits a system user to input information into and receive information from the computer system 420.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS

100 Microscope system
110 System
112 Interface
114 One or more processors
116 One or more storage devices
120 Illumination module 122 Light source
124 Modulation device
126 Spatially modulated light source
130 Sample
140 Microscope
142 Imaging sensor, stereoscopic depth sensor
150 Depth sensor
160 Display
170 Arm
180 Steering handles
210 Determining a depth characteristic
220 Controlling an illumination module
400 System
410 Microscope
420 Computer system

The invention claimed is:

1. An illumination system for a microscope system, the illumination system comprising:
an illumination module for providing a spatially modulated illumination of a sample; and
one or more processors configured to:
determine a depth characteristic of the sample, and
control the illumination module based on the depth characteristic of the sample,
wherein the depth characteristic comprises a slope of one or more portions of the sample, and the one or more processors is configured to control the illumination module based on the slope of the one or more portions of the sample, or
wherein the depth characteristic comprises a three-dimensional representation of a surface of the sample, and the one or more processors are configured to determine a shading of the illumination caused by the surface of the sample based on the three-dimensional representation of the surface of the sample, and to control the illumination module based on the shading of the illumination caused by the surface of the sample.

2. The illumination system according to claim 1, wherein the one or more processors are configured to control the illumination module such, that an intensity of the illumination is spatially modulated among the one or more portions of the sample based on the slope of the one or more portions of the sample.

3. The illumination system according to claim 1, wherein the illumination module is configured to spatially modulate an intensity of the illumination of the sample, wherein the one or more processors are configured to control the illumination module such, that an intensity of the illumination is spatially modulated based on the depth characteristic of the sample.

4. The illumination system according to claim 1, wherein the one or more processors are configured to obtain depth data of a depth sensor of the microscope system, wherein the one or more processors are configured to determine the depth characteristic of the sample based on the depth data.

5. The illumination system according to claim 4, wherein the one or more processors are configured to obtain the depth data from a Time of Flight sensor of the microscope system.

6. The illumination system according to claim 4, wherein the one or more processors are configured to obtain the depth data from a stereoscopic depth sensor of the microscope system.

7. The illumination system according to claim 1, wherein the illumination module comprises a light source for providing the illumination, and a modulation device for modulating the illumination provided by the light source.

8. The illumination system according to claim 1, wherein the illumination module comprises a spatially modulated light source.

9. The illumination system according to claim 1, wherein the one or more processors are configured to periodically update the depth characteristic of the sample.

10. The illumination system according to claim 1, wherein the depth characteristic of the sample represents a depth characteristic of a cavity of a surgical site.

11. The illumination system according to claim 1, wherein the depth characteristic of the sample represents a depth characteristic of a workpiece.

12. A microscope system comprising the illumination system according to claim 1 and a microscope.

13. The microscope system according to claim 12, wherein the microscope is a surgical microscope.

14. A system for a microscope system, the system comprising one or more processors and one or more storage devices, wherein the system is configured to:
determine a depth characteristic of a sample being illuminated by an illumination module of an illumination system; and
control the illumination module based on the depth characteristic of the sample, to provide a spatially modulated illumination of the sample,
wherein the depth characteristic comprises a slope of one or more portions of the sample, and the illumination module is controlled based on the slope of the one or more portions of the sample, or
wherein the depth characteristic comprises a three-dimensional representation of a surface of the sample, and a shading of the illumination caused by the surface of the sample is determined based on the three-dimensional representation of the surface of the sample, and the illumination module is controlled based on the shading of the illumination caused by the surface of the sample.

15. A method for a microscope system, the method comprising:
determining a depth characteristic of a sample being illuminated by an illumination module of an illumination system; and
controlling the illumination module based on the depth characteristic of the sample, to provide a spatially modulated illumination of the sample,
wherein the depth characteristic comprises a slope of one or more portions of the sample, and the illumination module is controlled based on the slope of the one or more portions of the sample, or
wherein the depth characteristic comprises a three-dimensional representation of a surface of the sample, and a shading of the illumination caused by the surface of the sample is determined based on the three-dimensional representation of the surface of the sample, and the illumination module is controlled based on the shading of the illumination caused by the surface of the sample.

16. A non-transitory, computer-readable medium comprising a program code for performing the method according to claim 15 when the program code is executed on a processor.

* * * * *